United States Patent [19]

Balai et al.

[11] Patent Number: 6,054,040
[45] Date of Patent: Apr. 25, 2000

[54] CATALYST FOR HYDROCRACKING AND METHOD FOR CATALYTIC HYDRODEWAXING OF GAS OIL

[75] Inventors: Mária Balai, Százhalombatta; Hermann Beyer; Gabriella Borbély, both of Budapest; István Czágler, Százhalombatta; Pál Fehér, Százhalombatta; János Forstner, Százhalombatta; Gábor Georgiádes, Százhalombatta; János Gergely, Százhalombatta; József Horváth; Béla Jóvér, both of Budapest; László Kántor, Százhalombatta; Imre Kovács, Martonvásár; István Lencse, Százhalombatta; József Perger, Budapest; József Petró, Százhalombatta; Ernö Rátosi, Budapest; Gabriella Pécsvári Szalmásné, Százhalombatta; László Szirmai, Érd; József Szöllösi, Budapest; László Zsida, Százhalombatta, all of Hungary

[73] Assignee: MOL Magyar Olaj- és Gázipari Részvénytársaság, Budapest, Hungary

[21] Appl. No.: 09/297,801
[22] PCT Filed: Dec. 16, 1996
[86] PCT No.: PCT/HU96/00077
§ 371 Date: Jun. 21, 1999
§ 102(e) Date: Jun. 21, 1999
[87] PCT Pub. No.: WO98/20970
PCT Pub. Date: May 22, 1998

[30] Foreign Application Priority Data

Nov. 8, 1996 [HU] Hungary .................................. 9603093

[51] Int. Cl.$^7$ .................................................. C10G 47/00
[52] U.S. Cl. ............... 208/111.35; 209/109; 209/111.01; 502/64; 502/66; 502/68; 502/71; 502/74
[58] Field of Search ........................ 208/111.01, 111.35, 208/109; 502/64, 66, 68, 71, 74, 77, 84

[56] References Cited

U.S. PATENT DOCUMENTS

| | | | |
|---|---|---|---|
| 4,548,705 | 10/1985 | Young et al. | 208/111 |
| 4,980,333 | 12/1990 | Landis et al. | 502/246 |
| 5,037,530 | 8/1991 | Kirker et al. | 208/118 |
| 5,110,572 | 5/1992 | Calabro et al. | 423/328 |
| 5,183,559 | 2/1993 | Kirker et al. | 208/119 |
| 5,236,882 | 8/1993 | Shih et al. | 502/554 |
| 5,284,577 | 2/1994 | Shih et al. | 208/251 H |
| 5,286,370 | 2/1994 | Chu et al. | 208/120 |
| 5,965,474 | 10/1999 | Balko et al. | 502/65 |

FOREIGN PATENT DOCUMENTS

| | | |
|---|---|---|
| 278851 | 8/1988 | European Pat. Off. |
| 515270 | 11/1992 | European Pat. Off. |

OTHER PUBLICATIONS

Gzrechowiak et al, Improved activity in hydrocracking with catalysts containing H–ZSM–5 zeolite, Heterog. Catal., 6$^{th}$, Pt. 2, pp. 95–100 (1987) (Abstract).

Sultanov et al, Manufacture of low–freezing fuel fractions from mixtures of paraffin–base petroleums, Khim Technol. Topl. Masel, 7, pp. 6–8 (1987) (Abstract).

Swift et al, Superactive nickel–aluminosilicate catalysts for hydroisomerization and hydrocracking of light hydrocarbons, Ind. Eng. Chem., Prod. Res. Develop., 13(2), pp. 106–110 (1974) (Abstract).

*Primary Examiner*—Tom Dunn
*Attorney, Agent, or Firm*—Hill & Simpson

[57] ABSTRACT

The invention relates to a new catalyst applicable in hydrocracking of hydrocarbons. The catalyst contains as catalytically active components: a) a ZSM-5 zeolite wherein 10–100% of the exchangeable hydrogen ions have been replaced by nickel ions, and b) 0.3–3 parts by weight of magadiite in hydrogen form for 1 part by weight of component (a). The catalyst can be applied in hydrodewaxing of gas oil, and enables the production with an extremely low pour point.

16 Claims, No Drawings

CATALYST FOR HYDROCRACKING AND METHOD FOR CATALYTIC HYDRODEWAXING OF GAS OIL

BACKGROUND OF THE INVENTION

This Application is a 371 of PCT/HU96100077, filed Dec. 16, 1996 which is based on Hungarian Application P9603093, filed Nov. 08, 1996.

The invention relates to a new catalyst applicable in hydrocracking of hydrocarbons. More particularly, the invention relates to a catalyst comprising as active components ZSM-5 zeolite which has been subjected to ion exchange with nickel and magadiite in hydrogen form (further on: Ni-ZSM-5/H-magadiite catalyst). This catalyst can be applied to particular advantage in hydrodewaxing of gas oil, and possesses high selectivity and a long life time.

The invention also relates to a method for producing arctic gas oil (i.e. gas oil with extremely low pour point) by subjecting gas oil to hydrodewaxing in the presence of the above catalyst.

It has been known for a long time that pour point of gas oils can be lowered by reducing the amount of higher straight-chained and moderately branched—with only single methyl groups in side chains—paraffins (further on: n-paraffins) contained therein. One of the methods suitable for reducing the amount of n-paraffins in gas oils is cracking in the presence of hydrogen and a catalyst, i.e. catalytic hydrocracking (hydrodewaxing) of gas oils. For this purpose, those catalysts (so-called shape-selective catalysts) are particularly suitable which catalyse only the cracking of higher n-paraffins intended to be removed, but do not or only slightly catalyse the cracking of other components (such as isoparaffins, lower hydrocarbons, etc). Such shape-selective catalysts have been disclosed, inter alia, in U.S. Pat. Nos. 3,700,585 and 3,894,934. A very widely used representative of shape-selective catalysts is the commercially available ZSM-5 zeolite catalyst in hydrogen form (ZSM-5 or, according to a more accurate terminology, H-ZSM-5) Utilizing such catalysts, pour point of gas oils can be lowered typically to –5 to –25° C., depending on the pour point of the starting substance. Hydrogen gas present at cracking does not participate in the reaction, and its role is only to suppress further dehydrogenation of olefins with a single unsaturated bond, which are one of the primary products of cracking This further dehydrogenation of olefins proceeds upon thermal effects, and leads to coke-formation on the catalyst, decreasing (in extreme cases even breaking down) thereby the activity of the catalyst. It is, however, obvious that further dehydrogenation of olefins with a single unsaturated bond can be suppressed only to an extent determined by the reaction equilibria under the prevailing conditions and by the law of mass action.

A smaller fraction of olefins with a single unsaturated bond, which form as primary products in hydrocacking, consists of lower hydrocarbons which appear in gasoline (a twin product of hydrocracking). These compounds have a favourable influence on the quality of gasoline However, the situation is different with higher olefins having a single unsaturated bond which appear in gas oil. Hydrogen present in the process only suppresses but does not prevent the thermal dehydrogenation of these latter olefins. A part of the resulting olefins with multiple unsaturated bonds adsorbs on the surface of the catalyst and gets coked there, whereas another part of them gets stabilized by conversion into aromatics. The resulting aromatics decrease the cetane number of gas oil and lead to an increase in noise level when gas oil is used in engines.

A method for suppressing these latter disadvantages has been disclosed in Hungarian Patent No. 209,141. According to this method, gas oil is subjected to hydrodewaxing in the presence of a catalyst comprising as active components ZSM-5 zeolite which has been subjected to ion exchange with nickel, and magadiite which has been subjected to ion exchange with nickel (Ni-ZSM-5/Ni-magadiite catalyst). This catalyst is able to suppress the formation of aromatics from olefins with multiple unsaturated bonds, whereby both the decrease in cetane number and the increase in noise level upon use in engines can be suppressed considerably, without affecting, however, the level of n-paraffin removal and thereby the pour point of the resulting gas oil.

However, with the increase of motorisation, there is an increasing need for gas oils with extremely low pour point, typically about or below –50° C., the production of which has not yet been solved.

SUMMARY OF THE INVENTION

Now we have found that when a catalyst comprising as active components ZSM-5 zeolite, which has been subjected to ion exchange with nickel, and magadiite in hydrogen form (i.e. Ni-ZSM-5/H-magadiite catalyst) is applied in the otherwise known catalytic hydrodewaxing of gas oil, a gas oil with extremely low pour point is obtained. The resulting gas oil can be safely used even under arctic conditions, without, however, affecting considerably either the cetane number of gas oil or the noise level when gas oil is used in an engine.

Additional features and advantages of the present invention are described in, and will be apparent from, the detailed description of the presently preferred enbodiments.

DETAILED DESCRIPTION OF THE PRESENTLY PREFERRED EMBODIMENTS

The present invention provides a catalyst for hydrocracking of hydrocarbons. Specifically, the catalyst of the present invention includes an Ni-ZSM-5 zeolite and a magadiite in hydrogen form. The inventors have discovered that the use of such a catalyst made pursuant to the present invention enables the production of a gas oil with extremely low pour point. Moreover, the product obtained with the catalyst of the present invention can even be utilized under arctic conditions, without considerably affecting either the cetane number of gas oil or the noise level when gas oil is used in an engine.

Thus, the invention relates to a catalyst suitable for hydrocracking hydrocarbons, particularly for hydrodewaxing gas oils. The catalyst according to the invention comprises as active components (a) ZSM-5 zeolite, which has been subject ad to ion exchange with nickel (Ni-ZSM-5) and (b) magadiite in hydrogen form (H-magadiite).

In Ni-ZSM-5, the one of the catalytically active components of the catalyst according to the invention, 10–100%, preferably 30–100%, more preferably 50–100%, particularly preferably 80–100%, of the exchangeable hydrogen ions of ZSM-5 zeolite in hydrogen form (H-ZSM-5) have been replaced by nickel ions The catalyst according to the invention comprises, for 1 part by weight of Ni-ZSM-5 with the above nickel replacement level, 0.3–3 parts by weight, preferably 0.5–2 parts by weight, particularly preferably 0.75–1.5 parts by weight, of H-magadiite.

The catalyst according to the invention may optionally also contain inert binders and/or auxiliary agents necessary for preparing a shaped catalyst. As binders and/or auxiliary agents, any substance known to be applicable for this purpose can be used, examples of which are water glass, phosphates and hydrated aluminum oxides. The amount of binders and/or auxiliary agents may be 1–95% by weight, usually 5–50% by weight, preferably 10–30% by weight, related to the total weight of the catalyst. It is, however, not absolutely necessary to use any binder or auxiliary agent, since the catalyst can also be applied as a powder mixture or in a form compressed without any binder.

We have found that using the above catalyst a gas oil with much lower pour point than usual, but at the same time with good cetane number and causing low noise level when used in an engine, can be produced. This observation is very surprising from many respect. Although from Hungarian patent No. 209 141, which discloses the use of a Ni-ZSM-5/Ni-magadiite catalyst, one could conclude that the presence of a magadiite component will suppress the cyclization of multiply unsaturated olefins, avoiding thereby a lowering in cetane number and an increase in noise level, but it could by no means be expected that the H-magadiite component will considerably increase the n-paraffin cracking activity of the catalyst. Since when one proceeds as disclosed in Hungarian patent No. 209,141, the n-paraffin content of the gas oil product (and its pour point closely connected therewith) is hardly changed as compared to that attainable by a method utilizing H-ZSM-5 catalyst alone. From a combination of the teachings of Hungarian patent No. 209,141 and U.S. Pat. Nos. 3,700,58 and 3,894,934, one skilled in the art could rather conclude that the magadiite component will suppress cyclization of multiply unsaturated olefins without, however, exerting any essential influence on the cracking of n-paraffins. Consequently, one could not expect that an arctic gas oil with a pour point of about −50° C. will form. A likewise unexpected observation is that the catalyst according to the invention has a longer life time than the catalyst disclosed in Hungarian Patent No. 209,141. Taking into account that coke formation is caused by multiply unsaturated olefins, and the introduction of Ni ions assists their partial rehydrogenation, one had to expect that the catalyst according to the invention, in which only one of the components comprises Ni-ions, will be less able to eliminate the formation of coke-forming compounds. Our practical experiences are, however, fully contrasted with this expectation. Without wishing to bound the essence of the invention to theoretical considerations, we assume that the favourable effects observed with the catalyst according to the invention (considerable increase in cracking of n-paraffins, prolonged life time of the catalyst) can be traced back to some specific favourable structural characteristics defined by the acidic centres of H-magadiite Ni-ZSM-5 zeolite, which is one of the active components of the catalyst according to the invention, can be prepared by, a known ion exchange process from commercially available Ni-ZSM-5 zeolite in H-form. Ion exchange can be performed (e.g. as disclosed in Hungarian patent No. 209, 141).

H-magadiite, the second active component of the catalyst according to the invention, is a commercially available material, which can also be prepared by known methods [see R. K. ller: J. Colloid Sci. 19, 648–657 (1964) and G. Lagaly et al.: Proc. Int. Clay Conf. Madrid, 1973, 663–673]. H-magadiite can also be prepared from magadiite with exchangeable cations other than hydrogen by a known ion exchange method (acidic treatment):

The catalyst according to the invention can be prepared by simply admixing the two active components. However, when a shaped catalyst with appropriate deformation stability is required, the two active components are admixed with conventional binders and/or auxiliary agents, the resulting mixture is granulated, and the granules are dried, if necessary.

When used for hydrodewaxing of gas oil, the above catalyst is calcined first in a known way (e.g. as described in Hungarian Patent No. 209,141), and then it is subjected to heat treatment in hydrogen or in a hydrogen-containing gas mixture, such as in reforming gas. This series of operation is termed here as "activation of the catalyst". Calcination is performed typically at 500–600° C. for 1–3 hours. Treatment with hydrogen is performed generally at a slightly lower temperature (e.g. at 400–550° C.) for 1–3 hours. gas oil is hydrodewaxed with the thus-activated catalyst under conditions disclosed in detail in the literature. The operational parameters may be e.g. the following:

reactor temperature: 300–500° C.
spatial velocity (LHSV): 1–2 $h^{-1}$
gas/liquid ratio: 500–1000 $Nm^3/m^3$
pressure: 30–50 bar The following non-limiting Examples serve to illustrate further details of the invention.

EXAMPLE 1

Preparation of the Catalyst 4300 g of Ni-ZSM-5, wherein 50% of the exchangeable hydrogen ions had been replaced by nickel ions, 3200 g of H-magadiite. 4.2 litres of ethyl silicate ($SiO_2$ content: 31–32%), 900 g of 65 w/w % $H_3PO_4$ 3 liters of water and 250 g of $Al(OH)_3$ were mixed, the resulting mass was granulated, and the granules were dried at 120° C.

EXAMPLE 2

Hydrodewaxing of Gas Oil with the Catalyst According to the Invention

Prior to use, 100 ml of the catalyst obtained according to Example 1 were calcined in the reactor at 550° C. for 2 hours, 3and then a reforming gas with a hydrogen content of 80 v/v % was passed through the catalyst at a rate of 100 l/hour for 12 hours under a pressure of 40 bar. Thereafter, hydrodewaxing of a gas oil (a 1:1 v/v mixture of Russian heavy gas oil and vacuum gas oil, its characteristics are listed in Table 1) was started under the following conditions:

reactor temperature: 340–430° C.
spatial velocity: 1.5 $h^{-1}$
gas/liquid ratio: 700 $Nm^3/m^3$
pressure 40 bar
$H_2$ content of reforming gas: 80 v/v %

The resulting product was distilled to remove gasoline fraction, and the characteristics of the resulting gas oil were determined. The results are given in Table 1.

EXAMPLE 3

Hydrodewaxing of Gas Oil with a Comparative Catalyst

For comparison purposes, the process described in Example 2 was repeated using a Ni-ZSM-5/Ni-magadiite catalyst prepared according to Example 1 of Hungarian patent No. 209,141. The results are given in Table 1.

TABLE 1

Characteristics of the starting substance and of the hydrodewaxed gas oils

| Characteristics | Starting substance | Hydrodewaxed gas oil product | |
|---|---|---|---|
| | | Ex. 2 | Ex. 3 |
| Density, kg/m$^3$ | 867 | 887 | 877 |
| Sulphur content, % | 0,905 | 1,05 | 0,98 |
| Nitrogen content, ppm | 230 | 235 | 233 |
| Basic nitrogen content, ppm | 129 | 138 | 134 |
| Viscosity at 20° C., cSt | 10,66 | 13,74 | 13,16 |
| Pour point, ° C. (ASTM D 2500) | 0 | −52 | −18 |
| Cetane index | 56 | 52 | 52 |
| Flash point, ° C. | 88 | 96 | 96 |
| Saturated compounds, w/w % | 63,4 | 56,3 | 53,42 |
| of them: n-paraffins, w/w % | 27 | 8,47 | 12,42 |
| Aromatics, w/w % | 36,60 | 43,70 | 46,60 |

It appears from the data of Table 1 that when using the catalyst according to the invention a gas oil with extremely low pour point (−52° C.), usable even under arctic conditions, can be obtained. Whereas the pour point of the product obtained with the closest known catalyst is only −18° C. At the same time, the product obtained with the catalyst according to the invention retains the favourable properties of the product prepared according to the closest known solution: its aromatics content and cetane index are essentially the same as those of the product obtained according to the comparative example.

When operating as described in Example 3 the activity of the catalyst decreased after 840 hours of operation to such an extent that refreshment was required (regeneration of the catalyst was, however, not yet necessary). Refreshment was performed by passing reforming gas through the catalyst for 12 hours at 500° C. In contrast, no refreshment of the catalyst according to the invention was required during the whole period of operation (1100 hours); the activity of the catalyst remained practically unchanged at the end of the 1100th hour. After 1100 hours of operation the reaction according to Example 2 was stopped, the catalyst was removed from the reactor, and its coke content was determined. 4.4 w/w % of coke visa deposited on the catalyst. As an information, in such reactions, catalysts require regeneration generally when 12–14 w/w % of coke has been deposited thereon.

It is understood that certain modifications and changes to the preferred embodiments described herein will be apparent to those skilled in the art. Such changes and modifications can be made without departing from the spirit and scope of the present invention and without diminishing it, intended advantages. Therefore, the appended claims are intended to cover such changes and modifications.

What we claim is:

1. A catalyst for hydrocracking of hydrocarbons, the catalyst comprising:
    (a) an Ni-ZSM-5 zeolite, wherein 10 to 100% of the exchangeable hydrogen ions have been replaced by nickel ions, and
    (b) a magadiite in hydrogen form, wherein 0.3 to 3 parts by weight of the magadiite is present for 1 part by weight of the Ni-ZSM-5 zeolite.

2. The catalyst of claim 1 wherein 50 to 100% of the exchangeable hydrogen ions have been replaced by nickel ions.

3. The catalyst of claim 1 wherein 0.5 to 2 parts by weight of the magadiite is present for 1 part by weight of the Ni-ZSM-5 zeolite.

4. The catalyst of claim 1 wherein 0.75 to 1.5 parts by weight of the magadiite is present for 1 part by weight of the Ni-ZSM-5 zeolite.

5. The catalyst of claim 1 further comprising a binder in an amount of 1 to 95 w/w % for the total weight of the catalyst.

6. The catalyst of claim 5 wherein the binder is present in an amount of 5 to 50 w/w % for the total weight of the catalyst.

7. The catalyst of claim 1 further comprising an auxiliary agent in an amount of 1 to 95 w/w % for the total weight of the catalyst.

8. The catalyst of claim 7 wherein the auxiliary agent is present in an amount of 5 to 50 w/w % for the total weight of the catalyst.

9. A method for catalytic hydrodewaxing of gas oil, the process comprising the step of:

hydrocracking a gas oil in the presence of a catalyst, the catalyst comprising:
    (a) an Ni-ZSM-5 zeolite, wherein 10 to 100% of the exchangeable hydrogen ions have been replaced by nickel ions, and
    (b) a magadiite in hydrogen form, wherein 0.3 to 3 parts by weight of the magadiite is present for 1 part by weight of the Ni-ZSM-5 zeolite.

10. The method of claim 9 wherein 50 to 100% of the exchangeable hydrogen ions in the Ni-ZSM-5 zeolite have been replaced by nickel ions.

11. The method of claim 9 wherein 0.5 to 2 parts by weight of the magadiite is present for 1 part by weight of the Ni-ZSM-5 zeolite.

12. The method of claim 9 wherein 0.75 to 1.5 parts by weight of the magadiite is present for 1 part by weight of the Ni-ZSM-5 zeolite.

13. The method of claim 9 wherein the catalyst further comprises a binder in an amount of 1 to 95 w/w % for the total weight of the catalyst.

14. The method of claim 13 wherein the binder is present in an amount of 5 to 50 w/w % for the total weight of the catalyst.

15. The method of claim 9 wherein the catalyst further comprises an auxiliary agent in an amount of 1 to 95 w/w % for the total weight of the catalyst.

16. The method of claim 15 wherein the auxiliary agent is present in an amount of 5 to 50 w/w % for the total weight of the catalyst.

* * * * *